United States Patent

Arai et al.

[11] Patent Number: 5,990,639
[45] Date of Patent: Nov. 23, 1999

[54] PHASE CONTROLLER FOR INTERMITTENTLY SUPPLYING AN AC MOTOR WITH ELECTRIC POWER

[75] Inventors: Hiroyuki Arai; Hiroyuki Yahagi; Shinichi Masuda, all of Tokyo, Japan

[73] Assignee: Satori Electric Co., Ltd., Tokyo, Japan

[21] Appl. No.: 09/102,634

[22] Filed: Jun. 23, 1998

[30] Foreign Application Priority Data

Jun. 25, 1997 [JP] Japan ................................. 9-168475

[51] Int. Cl.$^6$ ................................................ H02K 23/64
[52] U.S. Cl. ........................ 318/245; 318/244; 318/245
[58] Field of Search .................................. 318/244, 245; 388/825, 828, 829, 830, 831

[56] References Cited

U.S. PATENT DOCUMENTS

| | | | |
|---|---|---|---|
| 4,051,420 | 9/1977 | Tanikoshi | 318/254 |
| 4,528,456 | 7/1985 | Harris | 307/31 |
| 4,530,370 | 7/1985 | Cuneo | 318/331 |
| 5,015,928 | 5/1991 | Yang | 318/250 |
| 5,268,987 | 12/1993 | Sakoh | 388/819 |
| 5,399,948 | 3/1995 | Yang | 318/245 |
| 5,512,810 | 4/1996 | Hansen et al. | 318/800 |
| 5,530,325 | 6/1996 | Friedrich et al. | 318/245 |

*Primary Examiner*—Robert E. Nappi
*Assistant Examiner*—Rita Leykin
*Attorney, Agent, or Firm*—Nikaido Marmelstein Murray & Oram LLP

[57] ABSTRACT

An improved phase controller is operatively connected to the operating lever or trigger of an electrically powered tool for supplying its motor with electric power from an ac power supply. It includes a device for establishing a divisional voltage derived from the ac voltage across the electric power supply. A variable resistor-and-capacitor series-connection is connected across the motor-and-power supply series-connection. A device provided for supplying the ac motor with electric power when the charging voltage across the capacitor rises above the divisional voltage. The variable resistor is operatively connected to the operating lever, and the capacitor can be charged with electricity at a charging rate which is determined by the variable resistance and the fixed capacitance under the control of the operating lever. The divisional voltage varies in the same way as the voltage across the ac power supply, thus permitting the ignition angle to remain substantially unchanged no matter whether the commercially available electric power may be of different cycles.

2 Claims, 4 Drawing Sheets

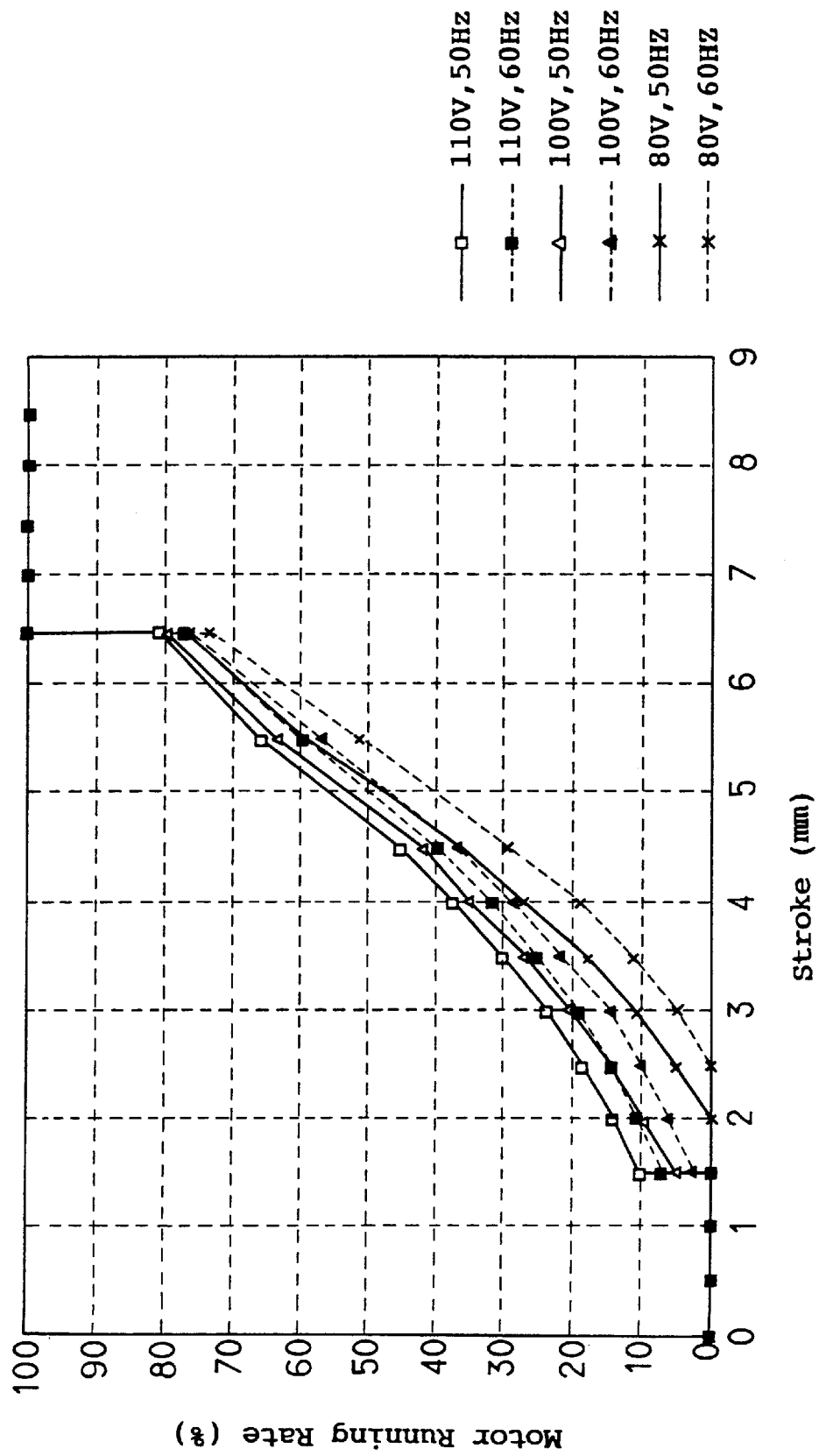

Stroke versus Motor Running Rate

PHASE CONTROLLER FOR INTERMITTENTLY SUPPLYING AN AC MOTOR WITH ELECTRIC POWER

BACKGROUND OF THE INVENTION

1. Field of the Invention

The present invention relates to a phase controller for an ac motor installed in an electrically-powered tool.

2. Description of Related Art

A conventional phase controller for an ac motor installed in an electrically-powered tool is shown in FIG. 4. The phase controller 1 is in circuit with an ac motor M and an ac power supply AC, and it comprises a power switch SW1, a high-rotation switch SW2, a thyristor SCR, a bidirectional switching device DIAC, a variable resistor $R_1$ operatively connected to the operating lever or trigger (not shown) of the electrically-powered tool, a diode D and a capacitor C.

The ac motor M is connected on one side to one side of the ac power supply AC, and the ac motor M is connected on the other side to the other side of the ac power supply AC through the series-connection of the power switch SW1 and the high-rotation switch SW2.

The thyristor SCR and a series-connection of the variable resistor $R_1$ and the capacitor C are parallel-connected with the high-rotation switch SW2.

The bidirectional switching device DIAC is connected between the gate electrode of the thyristor SCR and the joint between the variable resistor $R_1$ and the capacitor C, and the capacitor C is parallel-connected with the diode D.

The so constructed phase controller 1 is installed in an electrically-powered tool so that the power switch SW1 and high-rotation switch SW2 of the phase controller 1 may be made to turn on or off, depending on how much the operating lever or trigger is depressed. Also, the resistance of the variable resistor $R_1$ varies with the degree of depression of the operating lever, thereby permitting the rotating speed of the ac motor M to be controlled in terms of the variable resistance. The operation of the phase controller is described for ac power supplies of 50 and 60 Hz, respectively.

Referring to FIG. 5A, when the ac power supply of 50 Hz is used, the operating lever is pressed to permit the power switch SW1 to turn on, thus starting the charging of the capacitor C through the variable resistor $R_1$. When the charging voltage across the capacitor C rises above the break-over voltage DV of the bidirectional switching device DIAC (approximately 32 to 36 volts), the thyristor SCR is put in conductive condition from its anode-to-cathode electrode, thus supplying the ac motor M with electric power. The rate at which the charging voltage rises up to the break-over voltage DV of the bidirectional switching device DIAC is determined by the resistance of the variable resistor $R_1$. The more the operating lever is depressed, the sooner the charging voltage rises up to the break-over voltage DV.

As the operating lever is depressed, the resistance of the variable resistor $R_1$ decreases, and accordingly the charging rate of the capacitor C increases, thereby causing the angle of ignition of the thyristor SCR to lead for earlier position, and accordingly permitting the motor M to run at an increasing speed. On the contrary, as the operating lever is released, the resistance of the variable resistor $R_1$ increases, and accordingly the charging rate of the capacitor C decreases, thereby causing the ignition angle of the thyristor SCR to lag for later position, and accordingly permitting the motor M to run at a decreased speed.

Referring to FIG. 5(B), the phase controller is connected to an ac power supply of 60 Hz, permitting the capacitor C to be charged with electricity at the rate of time constant given by the variable resistance $R_1$ times the capacitance C, and accordingly the quantity of electric power fed to the ac motor M is controlled. More specifically, the capacitor C is charged repeatedly with electricity until the bidirectional switch DIAC turns on, triggering the thyristor SCR from its blocking to its conducting state in each positive half of the applied ac voltage for putting the ac motor M in running condition. It should be noted that the ignition angle lags much behind, compared with FIG. 5(A).

FIG. 6 is a graphic representation of the motor running rate (ordinate) versus the lever stroke or depression (abscissa). As for the initial stroke required for starting the motor M: the stroke difference W1 between the stroke for 50 Hz and the stroke for 60 Hz is 0.5 mm for 80 volts; the stroke difference W2 between the stroke for 50 Hz and the stroke for 60 Hz is 2 mm for 100 volts; and the stroke difference W3 is 4 mm for 110 volts (determined by extrapolation as indicated by broken lines). This initial stroke difference for 110 volts is fairly large.

Also, as seen from the graphic representation, the stroke difference is significantly large at the outset for respective voltages, but as the running rate rises, the stroke difference will decrease, converging at the coordinates of the stroke of 6.5 mm and the running rate of 80%, almost maximum speed. The more the initial stroke is large, the steeper the running rate rises toward the maximum speed.

As may be understood from the above, an electrically powered tool equipped with the conventional phase controller cannot be used at same running speed without depressing and moving its lever over a different distance for 50 or 60 Hz. This stroke difference is caused by the difference between the period for 50 Hz and 60 Hz (the period for 60 Hz being shorter than that for 50 Hz). Referring to FIGS. 5(A) and 5(B) again, the length of time T required for charging the capacitor C with electricity within the positive half of the waveform is almost equal for 50 and 60 Hz, and accordingly the remaining length of time (hatching area) allotted to the driving of the ac motor M for 50 Hz is longer than that for 60 Hz, thus permitting the ac motor M to be powered for a longer time for 50 Hz than for 60 Hz. This is the cause for the stroke difference for same running speed between ac power supplies of 50 and 60 Hz.

Also, disadvantageously if the voltage across the power supply fluctuates more or less, say ±10%, the rate at which the capacitor can be charged with electricity varies significantly, and the ignition angle of the thyristor SCR varies accordingly, and hence, the running speed of the ac motor M varies accordingly. Assume that the controlling parameters of an electrically powered tool is set for appropriate operation in the Kanto District, Japan (50 Hz), and that the electrically powered tool is used in the Kansai District (60 Hz), and then, the operating lever must be moved a longer distance at the outset in the Kansai District. Also, the running speed rises rapidly from the outset to the maximum speed. This causes a significant inconvenience in controlling the electrically powered tool.

SUMMARY OF THE INVENTION

One object of the present invention is to provide an electrically powered tool equipped with an improved phase controller whereby its lever stroke is made to be independent from any difference or variation in frequency (or period) and voltage of electric power supply, assuring that the ac motor is permitted to run at same speed for same lever stroke regardless of such frequency or voltage change.

To attain this object a phase controller operatively connected to an associated operating lever for intermittently supplying an ac motor with electric power from an ac power supply, is improved according to the present invention in that: it comprises means for establishing a divisional voltage derived from the ac voltage across the electric power supply, the divisional voltage having the same phase as the ac voltage across the electric power supply; a variable resistor-and-capacitor series-connection, the variable resistor being operatively connected to the operating lever, and the variable resistor-and-capacitor series-connection being so connected to the electric power supply to allow the capacitor to be charged with electricity at a charging rate which is determined by the variable resistance under the control of the operating lever; and means for supplying the ac motor with electric power when the charging voltage across the capacitor rises above the divisional voltage. The ac power supply may be of 50 Hz or 60 Hz.

Other objects and advantages of the present invention will be understood from the following description of a preferred embodiment of the present invention, which is shown in accompanying drawings:

BRIEF DESCRIPTION OF THE DRAWINGS

FIG. 2(A) shows a voltage waveform to be applied to the ac motor by the phase controller circuit of FIG. 1 when an ac power supply of 50 Hz is used whereas

FIG. 3 shows running rate-to-stroke curves plotted for different voltages and frequencies in the phase controller circuit of FIG. 1;

FIG. 5(A) shows a voltage waveform to be applied to the ac motor by the conventional phase controller of FIG. 4 when an ac power supply of 50 Hz is used whereas

DESCRIPTION OF THE PREFERRED EMBODIMENTS

Figure 1:
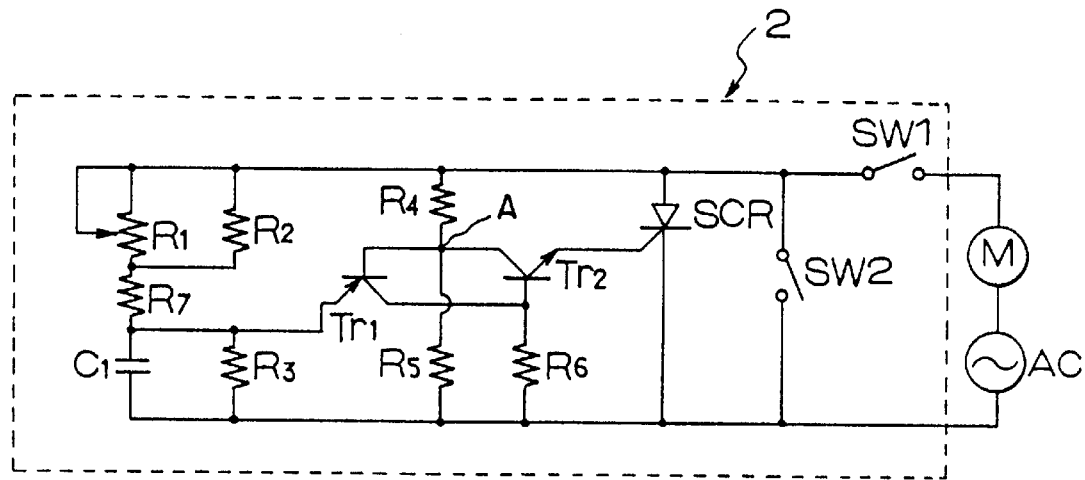
FIG. 1 shows a phase controller circuit according to the present invention.

Referring to FIG. 1, a phase controller 2 for supplying an ac motor M with electric power comprises a variable resistor $R_1$ operatively connected to the operating lever (not shown) of an electrically-powered tool, six resistors $R_2$ to $R_7$, a PNP transistor $Tr_1$, an NPN transistor $Tr_2$, a thyristor SCR for intermittently supplying the motor M with electric power, a capacitor C1, a power switch SW1, and a high-speed switch SW2.

The power switch SW1 and the high-speed switch SW2 are so operatively connected to the operating lever that they may be responsive to the depressing and releasing of the operating lever for turning on or off. The variable resistor $R_1$ is so operatively connected to the operating lever that its resistance may decrease (or increase) as the operating lever is depressed (or released).

These parts of the phase controller are connected as follows: one terminal of the ac motor M is connected to one terminal of the ac power supply AC, and the other terminal of the ac motor M is connected to the other terminal of the ac power supply AC through the power switch SW1 and the high-speed switch SW2.

The thyristor SCR, the series-connection of the resistors $R_4$ and $R_5$ and the series-connection of the variable resistors $R_1$, the resistor $R_7$ and the capacitor C1 are parallel-connected to the high-speed switch SW2. The resistor $R_2$ is parallel-connected to the variable resistor $R_1$, and the resistor $R_3$ is parallel-connected to the capacitor C1.

The emitter electrode of the PNP transistor $Tr_1$ is connected to the joint between the resistor $R_7$ and the capacitor C1.

The base electrode of the PNP transistor $Tr_1$ is connected to the joint between the resistor $R_4$ and the resistor $R_5$ (Point A) and to the collector electrode of the NPN transistor $Tr_2$. A divisional voltage whose phase is the same as the voltage across the ac power supply AC appears at Point A.

The collector electrode of the PNP transistor $Tr_1$ is connected to the joint between the base electrode of the NPN transistor $Tr_2$ and one terminal of the resistor $R_6$. The other terminal of the resistor $R_6$ is connected to the other terminal of the ac power supply AC.

The emitter electrode of the NPN transistor $Tr_2$ is connected to the gate electrode of the thyristor SCR.

In an electrically-powered tool equipped with the phase controller 2 the depressing of the operating lever will cause the power switch SW1 to turn on, thereby putting the series-connection of resistors $R_4$ and $R_5$ in circuit with the power supply AC. Thus, the divisional voltage appears at Point A. At the same time the charging of the capacitor C1 with electricity starts, allowing the charging voltage across the capacitor C1 to rise toward a divisional voltage appearing at the joint between the fixed resistor $R_3$ and $R_7$, which divisional voltage is determined by dividing the voltage across the power supply AC by the resultant resistance of variable resistance $R_1$ plus fixed resistance $R_2$, $R_3$ and $R_7$ and by multiplying the quotient by the fixed resistance $R_3$. In the instant of the charging voltage rising above the reference voltage at Point A, the PNP transistor $Tr_1$ and sequentially the NPN transistor $Tr_2$ turn on, and finally the thyristor SCR turns on. Then, the ac motor M is supplied with electric power from the power supply AC, and the ac motor M starts running. Here, it should be noted that the divisional voltage appearing at Point A and the charging voltage across the capacitor C1 depend on the frequency of the ac power supply, thereby permitting the ignition angle in the thyristor SCR to remain unchanged, and causing no effect on the running speed of the ac motor M irrespective of whether the frequency of the ac power supply may be 50 or 60 Hz, as described below by referring to FIG. 2.

Figure 2A:
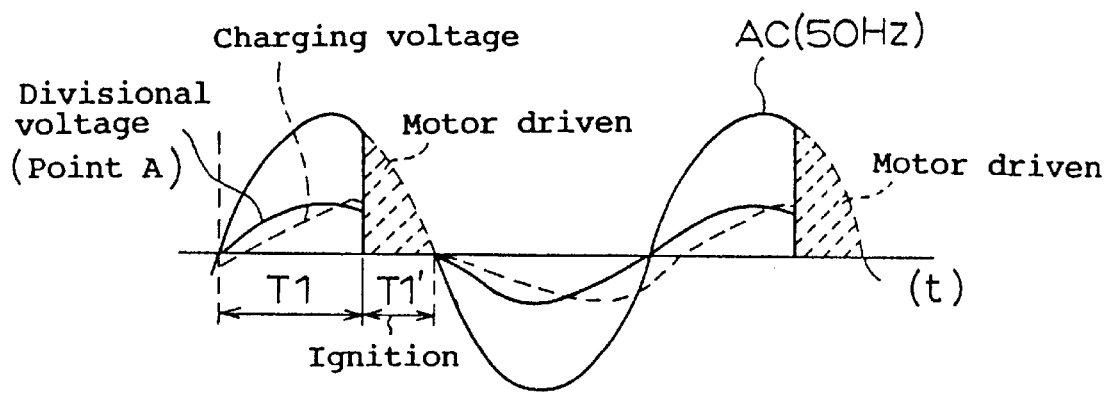
Figure 2B:
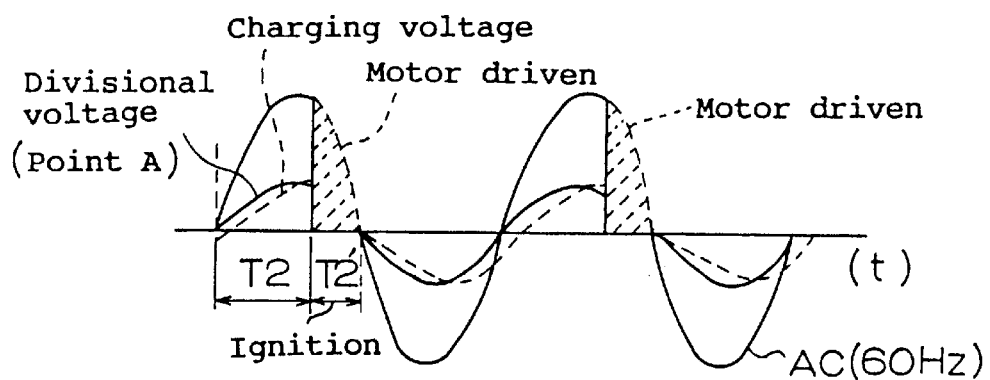
FIG. 2(B) shows a voltage waveform to be applied to the ac motor when an ac power supply of 60 Hz is used.

FIG. 2(A) shows what part of the voltage waveform can be supplied to the ac motor for 50 Hz, and FIG. 2(B) shows what part of the voltage waveform can be supplied to the ac motor for 60 Hz. These are shown for same amount of stroke, that is, same degree of depressing of the operating lever.

Figure 5A:
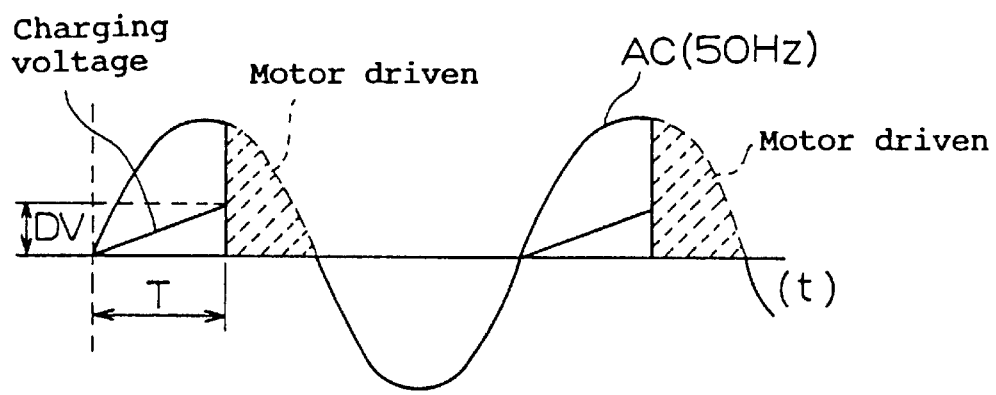

As seen from FIGS. 2(A) and (B), the period of the waveform of 50 Hz is longer than that of the waveform of 60 Hz, and the charging voltage across the capacitor C1 and the divisional voltage at Point A in FIG. 5(A) will vary as slow as the waveform of 50 Hz. When the charging voltage rises above the divisional voltage at Point A by the amount of forward voltage in the transistor $Tr_1$, the transistor $Tr_1$, and subsequently the transistor $Tr_2$ turn on, sending a gate-turnon signal to the thyristor SCR. Then, the thyristor SCR turns on to allow the ac power supply AC to supply the ac motor M with electric power.

Figure 5B:
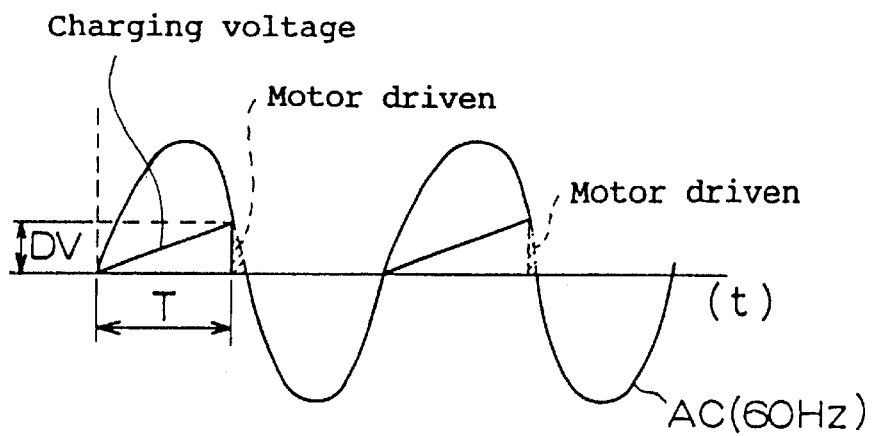
FIG. 5(B) shows a voltage waveform to be applied to the ac motor when an ac power supply of 60 Hz is used.

The period of the waveform of 60 Hz is shorter than that of the waveform of 50 Hz, and accordingly the charging voltage and the divisional voltage at Point A in FIG. 5(B) will vary as quick as the waveform of 60 Hz. When the charging voltage rises above the divisional voltage at Point A by the amount of forward voltage in the transistor $Tr_1$, the transistor $Tr_1$, and subsequently the transistor $Tr_2$ turn on, sending a gate-turnon signal to the thyristor SCR. Then, the thyristor SCR turns on to allow the ac power supply AC to supply the ac motor M with electric power.

The fractional length T2 of the positive half of the waveform of 60 Hz required for the charging voltage to rise over the divisional voltage at Point A by the amount of forward voltage in the transistor $Tr_1$ is shorter than the fractional length T1 of the positive half of the waveform of 50 Hz for same stroke of the operating lever. Therefore, the ignition time for the thyristor SCR comes earlier in the waveform of 60 Hz than in the waveform of 50 Hz for same stroke of the operating lever, thereby increasing the remaining length T2' for which the ac motor M is supplied with electric power (shading part) to be comparable with the remaining length T1' in 50 Hz, much longer than the remaining length for driving the motor M in FIG. 5B. It should be noted that for same stroke of the operating lever the angle for the thyristor SCR in the waveform of 50 Hz is almost equal to that in the waveform of 60 Hz in the phase controller of FIG. 1.

Even if the ac voltage should fluctuate (for instance, ±10%), the divisional voltage at Point A and the charging voltage will fluctuate at same ratio, so that the ignition angle for the thyristor SCR may be prevented from changing, permitting the ac motor M to run at same speed. Thus, the ac motor M is allowed to run at same speed for same stroke of the operating lever irrespective of voltage fluctuation in the ac power supply.

FIG. 3 shows how the running rate of the ac motor varies with the stroke of the operating lever in terms of different voltages and frequencies. As seen from these curves, the running rate of the ac motor varies with the stroke of the operating lever in same way for different voltages of 80, 100 and 110 volts and for different frequencies of 50 and 60 Hz.

Figure 4:
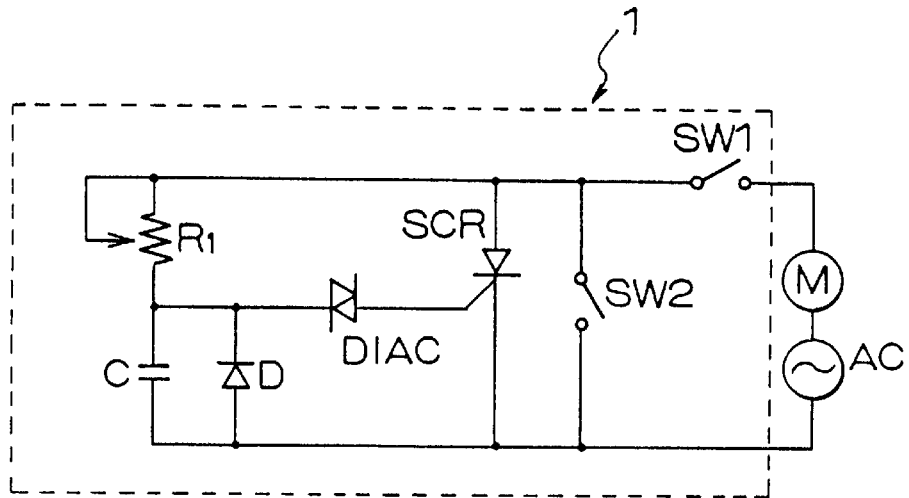
FIG. 4 shows a conventional phase controller circuit.

Table 1 shows how the running rate of the ac motor M varies with the stroke of the operating lever both in an electrically-powered tool equipped with a conventional phase controller (FIG. 4) and in an electrically-powered tool equipped with a phase controller according to the present invention.

TABLE 1

Figure 6:
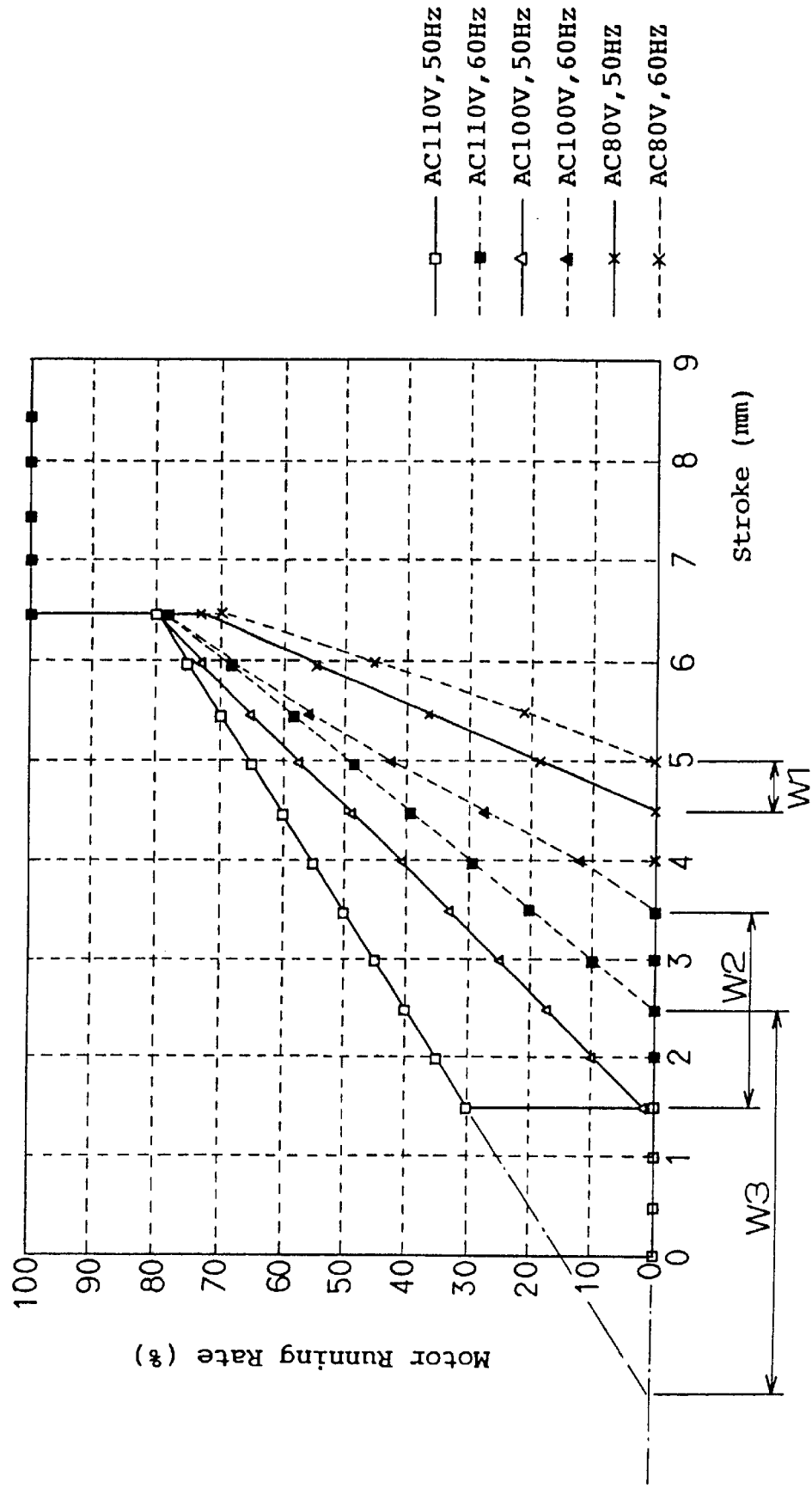
FIG. 6 shows running rate-to-stroke curves plotted for different voltages and frequencies in the conventional phase controller of FIG. 4.

| | ac power supply of 100 volts | | | |
|---|---|---|---|---|
| | running rate (%) | | | |
| | prior art (FIG. 6) | | present invention (FIG. 3) | |
| Stroke (mm) | 50 Hz | 60 Hz | 50 Hz | 60 Hz |
| 2 | 10 | 0 | 10 | 6 |
| 3 | 25 | 0 | 20 | 15 |
| 4 | 40 | 12 | 35 | 29 |
| 5 | 58 | 42 | 54 | 47 |
| 6 | 74 | 69 | 73 | 66 |

As seen from Table 1, in the prior art little or no relation is found between the running rate and the stroke for different frequencies of 50 and 60 Hz, and the running rates are liable to come close to each other suddenly as the stroke is increased beyond a certain distance. In contrast, in the present invention there is the same tendency in the running rate-versus-stroke relation for different frequencies and voltages, that is, the running rate is liable to follow the stroke irrespectively of different frequencies of 50 and 60 Hz and different voltages of 80, 100 and 110 volts.

As is apparent from the above, the running rate of the ac motor M varies with the stroke of the operating lever irrespectively of whether the ac power supply of 50 Hz or 60 Hz may be used, thus requiring neither extra dc power supply nor extra detection circuit for enabling the ac motor M to run at a speed proportional to the stroke of the operating lever irrespectively of whether the ac power supply of 50 Hz or 60 Hz may be used. Triggering means such as DIAC, SBS or PUT is not required for triggering the thyristor, either.

Advantageously an electrically powered tool equipped with a phase controller according to the present invention can be used equally in different districts in which electric power of different frequencies are commercially available, and therefore, there is no need for extra parts to be changed for assuring same performance for commercial electric power of different frequencies.

Also advantageously, an electrically powered tool equipped with a phase controller according to the present invention cannot be affected in performance by voltage fluctuations if any, in the power supply used.

What is claimed is:

1. A phase control circuit comprising:

an AC motor;

an AC voltage source connected to one side of said AC motor;

a power switch connected to another side of said AC motor;

a high-speed switch connected between another side of said power switch and another side of said AC voltage source;

a thyristor connected in parallel to said high-speed switch;

a variable resistor and a capacitor connected in parallel to said thyristor and in series to each other;

resistors connected in parallel to said variable resistor and capacitor and connected in series to each other;

a first transistor with an emitter side connected between said variable resistor and capacitor and a base side connected between said resistors; and a second transistor with a base side connected to a collector side of said first transistor, a collector side connected between said resistors and an emitter side connected to a gate side of said thyristor, wherein a divisional voltage having a phase substantially equal to that of said AC voltage source appears at a cross-point of a line connecting said resistors and another line connecting said transistors, and voltage of said AC voltage source is supplied to said AC motor to drive the same, when voltage charged to said capacitor becomes higher than the divisional voltage.

2. A phase control circuit as claimed in claim 1, wherein frequency of said AC voltage source is 50 or 60 Hz.

* * * * *